United States Patent
Tang

(10) Patent No.: US 11,412,352 B2
(45) Date of Patent: Aug. 9, 2022

(54) METHOD FOR ALLOCATING UE IDENTITY, NETWORK DEVICE, UE, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 41 days.

(21) Appl. No.: 16/938,421

(22) Filed: Jul. 24, 2020

(65) Prior Publication Data

US 2020/0359176 A1    Nov. 12, 2020

Related U.S. Application Data

(63) Continuation of application No. PCT/CN2018/074565, filed on Jan. 30, 2018.

(51) Int. Cl.
| | |
|---|---|
| *H04W 4/029* | (2018.01) |
| *H04W 76/11* | (2018.01) |
| *H04W 48/00* | (2009.01) |
| *H04W 68/00* | (2009.01) |
| *H04W 76/27* | (2018.01) |

(52) U.S. Cl.
CPC ........... *H04W 4/029* (2018.02); *H04W 48/17* (2013.01); *H04W 68/005* (2013.01); *H04W 76/11* (2018.02); *H04W 76/27* (2018.02)

(58) Field of Classification Search
CPC ..... H04W 4/029; H04W 76/11; H04W 76/27; H04W 48/17; H04W 68/005
USPC .......................................................... 370/329
See application file for complete search history.

(56) References Cited

U.S. PATENT DOCUMENTS

| | | | |
|---|---|---|---|
| 8,565,793 B1 | 10/2013 | Koodli | |
| 2013/0136072 A1* | 5/2013 | Bachmann | H04W 68/00 370/329 |
| 2015/0319800 A1* | 11/2015 | Park | H04L 1/12 370/329 |
| 2016/0057730 A1* | 2/2016 | Truelove | H04W 68/04 455/434 |
| 2017/0012847 A1 | 1/2017 | Lee et al. | |

FOREIGN PATENT DOCUMENTS

| | | |
|---|---|---|
| CN | 101267665 A | 9/2008 |
| CN | 103428854 A | 12/2013 |
| CN | 106304137 A | 1/2017 |

(Continued)

OTHER PUBLICATIONS

3GPP TSG SA WG2 S2 #59 S2-073791 Aug. 2007 (Year: 2007).*

(Continued)

*Primary Examiner* — William Nealon
(74) *Attorney, Agent, or Firm* — Ladas & Parry LLP

(57) ABSTRACT

A method for allocating a User Equipment (UE) identity, a network device, a UE and a computer storage medium are provided. The method includes: the network device allocates, based on a Tracking Area (TA) where the UE is located, unique identity information within the TA to the UE; and sends, to the UE, the unique identity information within the TA which is allocated to the UE.

14 Claims, 2 Drawing Sheets

(56) References Cited

FOREIGN PATENT DOCUMENTS

WO     2014148473 A1     9/2014
WO     2017011113 A1     1/2017

OTHER PUBLICATIONS

3GPP RAN WG2 R2-060917 Mar. 2006 (Year: 2006).*
3GPP TS 36.300 V14.5.0 TS 36.000 V14.5.0 Jan. 2018 (Year: 2018).*
Samsung, Analysis of Paging Overhead in Beamformed System, Discussion & Decision, 3GPP TSG-RAN WG2 Meeting #R2-700822. Feb. 13-17, 2017.
Written Opinion of the international Search Authority in the international application No. PC7/CN2018/074565, dated Oct. 19, 2018.
Catt: "TA list allocation and old TA identity selection" 3GPP Draft; S2-073791. 3GPP. vol. SA WG2, no. Helsinki, Finland; Aug 27, 2007-Aug. 31, 2007 Aug. 30, 2007 (Aug. 30, 2007), XP060773431, Retrieved from the Internet: URL: http://www.3gpp.org/ftp/tsg sa/WG2 Arch/TSGS2 59 Helsinki/Docs/ [retrieved on Aug. 30, 2007].
Siemens: "UE identities", 3GPP Draft; R2-060917-UE Identities, 3rd Generation Partnership Project (3GPP), Mobile Competence Centre; 650, Route DesLucioles; F-06921 Sophia-Antipolis Cedex; France, vol. RAN WG2, no. Athens, Greece; Mar. 23, 2006, Mar. 23, 2006 (Mar. 23, 2006), XP050130856, [retrieved on Mar. 23, 2006].
"LTE; Evolved Universal Terrestrial Radio Access (E-UTRA) andEvolved Universal Terrestrial Radio Access Network (E-UTRAN); Overall description; Stage 2 (3GPP TS 36.300 version 14.5.0 Release 14)", ETSI Technical Specification, vol. 3GPP RAN, No. V14.5.0 Jan. 17, 2018 (Jan. 17, 2018), pp. 1-346, XP014311483, Retrieved from the Internet: URL: http://www.etsi.org/deliver/etsi ts/136300 136399/136300/14.05.00 60/ts_136300v140500p. pdf [retrieved on Jan. 17, 2018].
Oppo: "Discussion a paging overload reduction due to beam sweeping", 3GPP Draft: R2-1801803—Discussion on Paging Overlad Due to Beam Sweeping. 3rd Generation Partnership Project (3GPP) Mobile Competence Centre: 650, Route Des Lucioles : F-06921 Sophia-Antipolis Cedex vol. RAN WG2, no. Athens, Greece; Feb. 26, 2018-Mar. 2, 2018 Feb. 14, 2018 (Feb. 14, 2018), XP051399000, Retrieved from the Internet: URL: http://www.3gpp.org/ftp/tsg%5Fran/WG25FRL2/TSGR2%5F101/Docs/ [retrieved on Feb. 14, 2018].
Supplementary European Search Report in the European application No. 18903890.4, dated Dec. 9, 2020.
International Search Report in the international application No. PCT/CN2018/074566, dated Oct. 19, 2018.

* cited by examiner

METHOD FOR ALLOCATING UE IDENTITY, NETWORK DEVICE, UE, AND COMPUTER STORAGE MEDIUM

CROSS-REFERENCE TO RELATED APPLICATIONS

The application is a continuation application of PCT Application No. PCT/CN2018:74565 filed on Jan. 30, 2018, the disclosure of which is incorporated by reference herein in its entity.

BACKGROUND

User Equipment (UE) in 5 Generation (5G) is similar to that in Long Term Evolution (LTE). The UE first registers with a core network, and then context information of the UE exists in the core network. A piece of the information among the context information of the UE is location area information, i.e., a Tracking Area (TA) list. When there is a paging for the UE, the core network sends a paging message to all base stations in the TA list of the UE, and triggers each of the base stations to page the UE in all cells under the base station. Therefore, a paging range of a UE is at least all cells within a TA range.

There is a UE record list in a paging message sent by a base station side to the UE, and the UE record list contains identity information (i.e., Serving-Temporary Mobile Subscriber Identity, S-TMSI) of at most 16 UEs. The UE judges, through reading the S-TMSI in the UE record list in the paging message, whether the UE itself is paged. The number of bits of the S-TMSI is 40 bits. The S-TMSI is a part of a temporary identity allocated by the core network to the UE. Therefore, in the related art, since a large number of bits are allocated to the identity of the UE during paging, this may cause a problem of long transmission signaling length.

SUMMARY

The disclosure relates to the field of information processing technologies, the embodiments of the disclosure provide a method for allocating a UE identity, a network device, a UE and a computer storage medium.

In a first aspect, the embodiments of the disclosure provide a method for allocating a UE identity, which is applied to a network device and includes the following operations.

Unique identity information within a TA is allocated to a UE based on the TA where the UE is located.

The unique identity information within the TA, which is allocated to the UE, is sent to the UE.

In a second aspect, the embodiments of the disclosure provide a method for allocating a UE identity, which is applied to a UE and includes the following operations.

Unique identity information of the UE within a TA is acquired from a network side.

In a third aspect, the embodiments of the disclosure provide a network device, which includes a processor and a network interface.

The processor is configured to allocate, based on a TA where a UE is located, unique identity information within the TA to the UE.

The processor is configured to invoke the network interface to send, to the UE, the unique identity information within the TA which is allocated to the UE.

In a fourth aspect, the embodiments of the disclosure provide a UE, which includes a processor and a network interface.

The processor is configured to invoke the network interface to acquire, from a network side, unique identity information of the UE within a TA.

In a fifth aspect, the embodiments of the disclosure provides a non-transitory computer storage medium storing computer-executable instructions that, when executed by a processor of a network device or a UE, implement the method in the first aspect or the second aspect.

DETAILED DESCRIPTION

In order to understand the features and technical contents of the embodiments of the disclosure in more detail, the implementation of the embodiments of the disclosure will be described in detail below with reference to the accompanying drawings. The accompanying drawings are for reference only and are not intended to limit the embodiments of the disclosure.

First Embodiment

Figure 1:
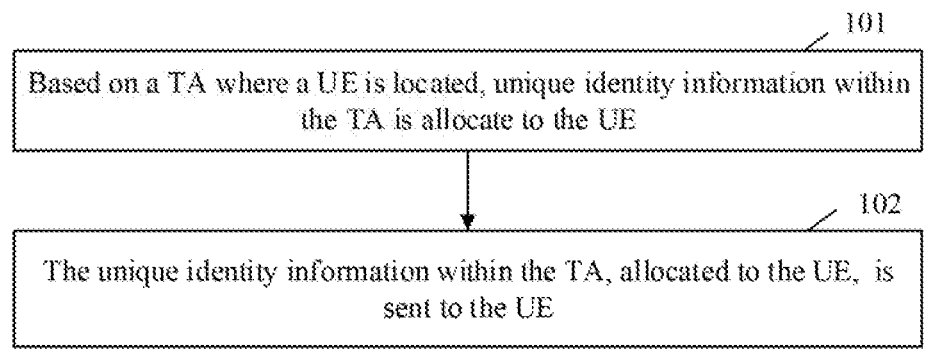
FIG. 1 is a flowchart of a method for allocating a UE identity according to an embodiment of the disclosure.

An embodiment of the disclosure provides a method for allocating a UE identity, applied to a network device. As illustrated in FIG. 1, the method includes the following operations.

At 101: based on a TA where a UE is located, unique identity information within the TA is allocated to the UE.

At 102: the unique identity information within the TA, allocated to the UE, is sent to the UE.

Here, the network device may be a device in a core network.

In this solution, a unique UE identity within a TA range is allocated to the UE. If a TA list is allocated to the UE during the UE performs location update, then for each TA in the TA list, a unique UE identity within the TA is allocated.

The operation of the unique identity information within the TA is allocated to the UE further includes: when the UE is in an attach procedure or a location area update procedure, the unique identity information within the TA is allocated to the UE, and a TA list is allocated to the UE.

Correspondingly, the operation of the unique identity information within the TA, allocated to the UE, is sent to the UE includes: the unique identity information of the UE within the TA and the TA list are sent to the UE through an attach response message or a location update response message.

In other words, in an attach procedure or a location area update procedure of the UE, when a network side allocates a TA list to the UE, the network side allocates, for each TA, a unique identity within the TA; and then sends, to the UE, the unique identity information of the UE within the TA and the TA list through an attach response message or a location update response message.

Based on the foregoing processing, when a paging message for the UE is to be sent, a base station corresponding to the UE is determined according to the TA list; and a paging trigger message is sent to the base station corresponding to the UE, and the unique identity information of the UE within the TA corresponding to the base station is carried in the paging trigger message carries, so that the base station generates the paging message for the UE based on the unique identity information within the TA and sends the paging message for the UE.

Specifically, the network side, when sending the paging message, selects a corresponding base station according to the TA list and sends a paging trigger message to the base station; and carries, in the paging trigger message, the identity information of the UE within the TA corresponding to the base station. The base station, when sending the paging message, identifies the paged UE in the paging message through the UE identity indicated by the core network.

Correspondingly, the UE, when receiving the paging message, determines whether there is the paging message for the UE itself through reading a TA where a cell is located to acquire a UE identity, allocated by the network side to the UE, within the TA.

It should also be noted that the identity information is also be configured to identify a UE in an initial Radio Resource Control (RRC) connection establishment initiated by the UE. Specifically, the UE, when initiating the initial RRC connection establishment, acquires TA information of a cell and the unique identity information of the UE within the TA; and addresses context information of the UE based on the unique identity information within the TA carried in a RRC connection request message and the TA information.

That is, when the initial context is established, the base station needs to send the unique identity information within the TA together with the corresponding TA information to a Mobile Management Entity (MME)(e.g., the network device in the present embodiment), so as to identify the context information of the UE.

According to the above solution, it is possible to allocate, based on the TA where the UE is located, the unique identity information within the TA to the UE, so as to use the unique identity information to send a paging message to identify the UE and identify the UE in the initial RRC connection establishment of the UE. In this way, it is possible to reduce the load of transmission signaling for the UE on the network side, especially the load of paging signaling and the load of an initial RRC connection establishment message.

Second Embodiment

An embodiment of the disclosure provides a method for allocating a UE identity, applied to a UE. The method includes: unique identity information of the UE within a TA is acquired from a network side.

Here, the network device may be a device in a core network. The UE may be a terminal device in a mobile network.

In this solution, a unique UE identity within a TA range is allocated to the UE. If the UE performs location update and thus is allocated with a TA list, then for each TA in the TA list, a unique UE identity within the TA is allocated.

The method provided by the embodiment of the disclosure further includes: when the UE is in an attach procedure or a location area update procedure, the unique identity information of the UE within the TA and a TA list are acquired through an attach response message or a location update response message from the network side.

In other words, in an attach procedure or a location area update procedure of the UE, when the network side allocates a TA list to the UE, the network side allocates, for each TA, a unique identity within the TA; and then sends the unique identity information of the UE within the TA along with the TA list to the UE through an attach response message or a location update response message.

Based on the foregoing processing, when a paging message for the UE is to be sent, a base station corresponding to the UE is determined according to the TA list; and a paging trigger message is sent to the base station corresponding to the UE, and the unique identity information of the UE within the TA corresponding to the base station is carried in the paging trigger message, so that the base station generates the paging message for the UE based on the unique identity information within the TA and sends the paging message for the UE.

Specifically, the network side, when sending the paging message, selects a corresponding base station according to the TA list and sends a paging trigger message to the base station; and carries, in the paging trigger message, the identity information of the UE within the TA corresponding to the base station. The base station, when sending the paging message, identifies the paged UE in the paging message through the UE identity indicated by the core network.

Correspondingly, the UE, when receiving the paging message, detects, based on unique identity information within a TA of a cell where the UE is located, whether the network side sends the paging message for the UE. That is, the UE, when receiving the paging message, determines whether there is the paging message for the UE itself through reading the TA where the cell is located to acquire a UE identity, allocated by the network side to the UE, within the TA.

It should also be noted that the identity information is also be configured to identify a UE in an initial RRC connection establishment initiated by the UE. Specifically, the UE, when initiating the initial RRC connection establishment, acquires TA information of a cell and the unique identity information of the UE within the TA; and addresses context information of the UE based on the unique identity information within the TA carried in a RRC connection request message and the TA information.

That is, when the initial context is established, the base station needs to send the unique identity information within the TA together with the corresponding TA information to an MME (such as the network device in the present embodiment), so as to identify the context information of the UE.

By adopting the above solution, it is possible to allocate, based on the TA where the UE is located, the unique identity information within the TA to the UE, so as to use the unique identity information to send a paging message to identify the UE and identify the UE in the initial RRC connection establishment of the UE. In this way, it is possible to reduce the load of transmission signaling for the UE on the network side, especially the load of paging signaling and the load of an initial RRC connection establishment message.

Third Embodiment

Figure 2:
FIG. 2 is a structural diagram of composition of a network device according to an embodiment of the disclosure.

An embodiment of the disclosure provides a network device. As illustrated in FIG. 2, the network device includes a first processing unit 21 and a first communication unit 22.

The first processing unit 21 is configured to allocate, based on a TA where a UE is located, unique identity information within the TA to the UE.

The first communication unit 22 is configured to send, to the UE, the unique identity information within the TA which is allocated to the UE.

Here, the network device may be a device in a core network.

In this solution, a unique UE identity within a TA range can be allocated to the UE. If a TA list is allocated to the UE during the UE performs location update, then for each TA in the TA list, a unique UE identity within the TA is allocated.

The first processing unit 21 is configured to: allocate the unique identity information within the TA to the UE and allocates a TA list to the UE, when the UE is in an attach procedure or a location area update procedure.

Correspondingly, the first communication unit 22 is configured to send, to the UE, the unique identity information of the UE within the TA and the TA list through an attach response message or a location update response message.

In other words, in an attach procedure or a location area update procedure of the UE, the network side, when allocating a TA list to the UE, allocates, for each TA, an unique identity within the TA; and then sends, to the UE, the unique identity information of the UE within the TA and the TA list through an attach response message or a location update response message.

Based on the foregoing processing, the first processing unit 21 is configured to determine a base station corresponding to the UE according to the TA list, when a paging message for the UE is to be sent; and the first communication unit 22 is configured to: send a paging trigger message to the base station corresponding to the UE, and carries, in the paging trigger message, the unique identity information of the UE within the TA corresponding to the base station, so that the base station generates the paging message for the UE based on the unique identity information within the TA and sends the paging message for the UE.

Specifically, the network side, when sending the paging message, selects a corresponding base station according to the TA list and sends a paging trigger message to the base station; and carries, in the paging trigger message, the identity information of the UE within the TA corresponding to the base station. The base station, when sending the paging message, identifies the paged UE in the paging message through the UE identity indicated by the core network.

Correspondingly, the UE, when receiving the paging message, judges whether there is the paging message for the UE itself through reading a TA where a cell is located to acquire a UE identity, allocated by the network side for the UE, within the TA.

It should also be noted that the identity information can also be configured to identify a UE in an initial RRC connection establishment initiated by the UE. Specifically, the first processing unit 21 is configured to: acquire TA information of a cell and the unique identity information of the UE within the TA when the UE initiates an initial RRC connection establishment; and address context information of the UE based on the unique identity information within the TA carried in a RRC connection request message and the TA information.

That is, when the initial context is established, the base station needs to send the unique identity information within the TA together with the corresponding TA information to an MME (such as the network device in the present embodiment), so as to identify the context information of the UE.

By adopting the above solution, it is possible to allocate, based on the TA where the UE is located, the unique identity information within the TA to the UE, so as to use the unique identity information to send the paging message to identify the UE and identify the UE in the initial RRC connection establishment of the UE. In this way, it is possible to reduce the load of transmission signaling for the UE on the network side, especially the load of paging signaling and the load of an initial RRC connection establishment message.

Fourth Embodiment

Figure 3:
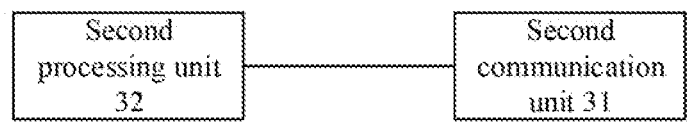
FIG. 3 is a structural diagram of composition of a UE according to an embodiment of the disclosure.

An embodiment of the disclosure provides a UE. As illustrated in FIG. 3, the UE includes: a second communication unit 31 is configured to acquire, from a network side, unique identity information of the UE within a TA.

Here, the network device may be a device in a core network. The UE may be a terminal device in a mobile network.

In this solution, a unique UE identity within a TA range can be allocated to the UE. If a TA list is allocated to the UE during the UE performs location update, then for each TA of the TA list, a unique UE identity within the TA is allocated.

The second communication unit 31 is configured to: acquire the unique identity information of the UE within the TA and a TA list through an attach response message or a location update response message from the network side, when the UE is in an attach procedure or a location area update procedure.

In other words, in an attach procedure or a location area update procedure of the UE, the network side allocates a TA list to the UE, and allocates, for each TA, an unique identity within the TA; and then sends, to the UE, the unique identity information of the UE within the TA and the TA list through an attach response message or a location update response message.

Based on the foregoing processing, when a paging message for the UE is to be sent, a base station corresponding to the UE is determined according to the TA list; and a paging trigger message is sent to the base station corresponding to the UE, and the unique identity information of the UE within the TA corresponding to the base station is carried in the paging trigger message, so that the base station generates the paging message for the UE based on the unique identity information within the TA and sends the paging message for the UE.

Specifically, the network side, when sending the paging message, selects a corresponding base station according to the TA list and sends a paging trigger message to the base station, and carries, in the paging trigger message, the identity information of the UE within the TA corresponding to the base station. The base station, when sending the paging message, uses the UE identity indicated by the core network to identify the paged UE in the paging message.

Correspondingly, when the UE receives the paging message, the UE further includes a second processing unit 32.

The second processing unit 32 is configured to detect, based on unique identity information within a TA of a current cell where the UE is located, whether the network side sends the paging message for the UE. That is, the UE, when receiving the paging message, judges whether there is the paging message for the UE itself through reading the TA where the cell is located to acquire a UE identity, allocated by the network side to the UE, within the TA.

It should also be noted that the identity information can also be configured to identify a UE in an initial RRC connection establishment initiated by the UE. Specifically, the UE, when initiating the initial RRC connection establishment, acquires TA information of a cell and the unique identity information of the UE within the TA; and addresses context information of the UE based on the unique identity information within the TA carried in a RRC connection request message and the TA information.

That is, when the initial context is established, the base station needs to send the unique identity information within the TA together with the corresponding TA information to an MME (such as the network device in the present embodiment), so as to identify the context information of the UE.

By adopting the above solution, it is possible to allocate, based on the TA where the UE is located, the unique identity information within the TA to the UE, so as to use the unique identity information to send the paging message to identify the UE and identify the UE in the initial RRC connection establishment of the UE. In this way, it is possible to reduce the load of transmission signaling for the UE on the network side, especially the load of paging signaling and the load of an initial RRC connection establishment message.

Figure 4:
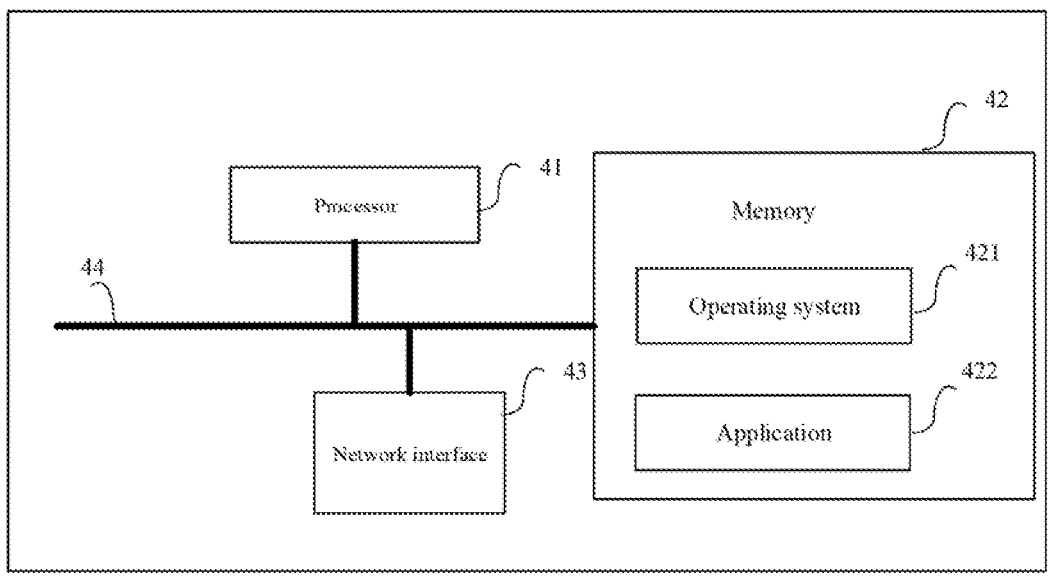
FIG. 4 is a diagram of a hardware architecture according to an embodiment of the disclosure.

An embodiment of the disclosure further provides a hardware composition architecture of a UE or a network device. As illustrated in FIG. 4, the hardware composition architecture includes: at least one processor 41, a memory 42 and at least one network interface 43. All components are coupled together through a bus system 44. It can be understood that the bus system 44 is configured to implement connection and communication between these components. The bus system 44 includes a data bus and further includes a power bus, a control bus and a status signal bus. However, for the sake of clarity, various buses are labeled as the bus system 44 in FIG. 4.

It can be understood that the memory 42 in the embodiment of the disclosure may be a volatile memory or a non-volatile memory, or may include both the volatile memory and the non-volatile memory.

In some embodiments, the memory 42 stores the following elements, an executable module or a data structure, or subsets thereof, or supersets thereof:
  an operating system 421 and an application 422.

The processor 41 is configured to be capable of processing the operations of the method in the first or second embodiment, and the details are not described herein again.

The embodiments of the disclosure provides a computer storage medium storing computer executable instructions that, when executed, implement the operations of the method in the first or second embodiment.

When being implemented in form of software functional module and sold or used as an independent product, the devices of the embodiments of the disclosure may also be stored in a computer-readable storage medium. Based on such an understanding, the technical solutions of the embodiments of the disclosure substantially or parts making contributions to the related art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes various media capable of storing program codes, such as a U disk, a mobile hard disk, a Read Only Memory (ROM), a magnetic disk or an optical disk. Therefore, the embodiments of the disclosure are not limited to any specific hardware and software combination.

Although the exemplary embodiments of the disclosure have been disclosed for illustrative purposes, those skilled in the art will recognize that various improvements, additions and replacements are also possible. Therefore, the scope of the disclosure should not be limited to the above embodiments.

The invention claimed is:

1. A method for allocating a User Equipment (UE) identity, executed by a network device, the method comprising:
   allocating a Tracking Area (TA) list to a UE and allocating, for each TA in the TA list, unique identity information of the UE within the TA to the UE, when the UE is performing an attach procedure or a location area update procedure; and
   sending, to the UE, the TA list and the respective unique identity information of the UE within each TA in the TA list, through an attach response message when the UE is performing the attach procedure or through a location update response message when the UE is performing the location area update procedure.

2. The method of claim 1, further comprising:
   determining a base station corresponding to the UE according to the TA list when a paging message for the UE is to be sent; and
   sending a paging trigger message to the base station corresponding to the UE, and carrying, in the paging trigger message, the unique identity information of the UE within the TA in the TA list corresponding to the base station, wherein the unique identity information of the UE within the TA corresponding to the base station causes the base station to generate and send the paging message for the UE.

3. The method of claim 1, further comprising:
   acquiring TA information of a cell where the UE is located and the unique identity information of the UE within the TA in the TA list, when the UE initiates an initial Radio Resource Control (RRC) connection establishment; and
   addressing context information of the UE based on the unique identity information of the UE within the TA carried in a RRC connection request message and the TA information.

4. The method of claim 1, wherein the network device is a device in a core network.

5. A method for allocating a User Equipment (UE) identity, executed by a UE, the method comprising:
   acquiring, from a network device, a Tracking Area (TA) list and respective unique identity information of the UE within each TA in the TA list through an attach response message when the UE is performing an attach procedure or through a location update response message when the UE is performing a location area update procedure.

6. The method of claim 5, further comprising:
   detecting, based on unique identity information within a TA in the TA list of a cell where the UE is located, whether a base station corresponding to the UE sends a paging message for the UE.

7. A network device, comprising: a processor and a network interface, wherein
   a processor is configured to allocate, a Tracking Area (TA) list to User Equipment (UE) and allocate, for each TA in the TA list, unique identity information of the UE within the TA to the UE, when the UE is performing an attach procedure or a location area update procedure; and
   invoke the network interface to send, to the UE, the TA list and the respective unique identity information of the UE within each TA in the TA list, through an attach response message when the UE is performing an attach procedure, or through a location update response message when the UE is performing a location area update procedure.

8. The network device of claim 7, wherein the processor is configured to determine a base station corresponding to the UE according to the TA list when a paging message for the UE is to be sent; and invoke the network interface to send a paging trigger message to the base station corresponding to the UE, and carries, in the paging trigger message, the unique identity information of the UE within the TA in the TA list corresponding to the base station, wherein the unique identity information of the UE within the TA corresponding to the base station causes the base station to generate and send the paging message for the UE.

9. The network device of claim 7, wherein the processor is configured to acquire TA information of a cell where the UE is located and the unique identity information of the UE within the TA in the TA list, when the UE initiates an initial Radio Resource Control (RRC) connection establishment; and address context information of the UE based on the unique identity information of the UE within the TA carried in a RRC connection request message and the TA information.

10. The network device of claim 7, wherein the network device is a device in a core network.

11. User Equipment (UE), comprising: a processor and a network interface, wherein the processor is configured to invoke the network interface to perform the method for allocating a UE identity according to claim 5.

12. The UE of claim 11, wherein the processor is configured to detect, based on unique identity information within a TA in the TA list of a cell where the UE is located, whether a base station corresponding to the UE sends a paging message for the UE.

13. A non-transitory computer storage medium, having stored thereon computer executable instructions that, when executed by a processor of a network device, cause the network device to implement the method of claim 1.

14. A non-transitory computer storage medium, having stored thereon computer executable instructions that, when executed by a processor of User Equipment (UE), cause the UE to implement the method of claim 5.

* * * * *